United States Patent [19]

Clark

[11] Patent Number: 5,174,272
[45] Date of Patent: Dec. 29, 1992

[54] CHARCOAL GRILL DISCHARGE COLLECTOR

[76] Inventor: Andrew J. Clark, 1226 Sixty-Second St., Downers Grove, Ill. 60516

[21] Appl. No.: 880,158

[22] Filed: May 6, 1992

[51] Int. Cl.⁵ ................................................ F23J 1/00
[52] U.S. Cl. .................................. 126/242; 126/25 R; 126/41 R
[58] Field of Search ................ 126/242, 25 R, 41 R, 126/245, 51, 383; 220/300, 301, 630; 248/509, 152, 150, 149

[56] References Cited

U.S. PATENT DOCUMENTS

| | | | |
|---|---|---|---|
| 2,960,979 | 11/1960 | Stone | 126/30 X |
| 4,576,140 | 3/1986 | Schlosser | 126/9 B |
| 4,628,901 | 12/1986 | Poulous | 126/25 R X |
| 4,741,322 | 5/1988 | Lin | 126/242 X |
| 4,763,640 | 8/1988 | Schnack et al. | 126/243 |
| 4,879,990 | 11/1989 | Clark | 126/242 X |
| 5,036,832 | 8/1991 | Schlosser et al. | 126/25 R X |

Primary Examiner—Larry Jones

[57] ABSTRACT

The charcoal grill discharge collector is to be used on a charcoal grill of the type having a round, kettle-like body supported by a plurality of inclined legs for the purpose of capturing and storing ash, embers and bits of charcoal emanating from the grill body's vent ports.

1 Claim, 4 Drawing Sheets

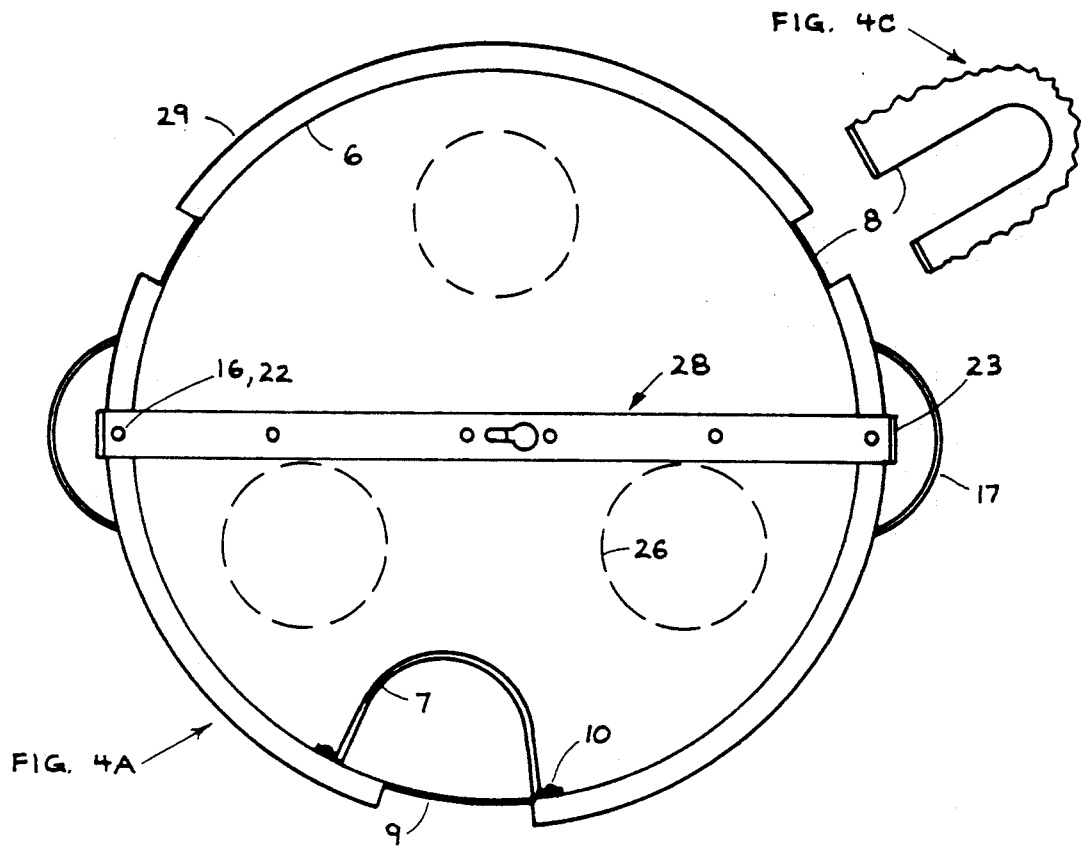
FIGURE 4
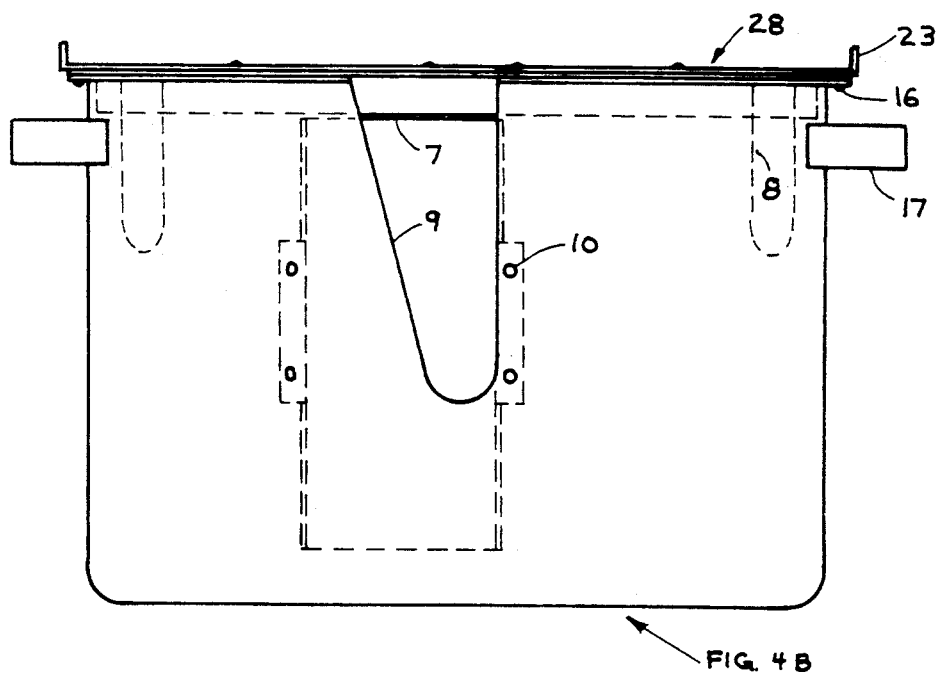

5,174,272

CHARCOAL GRILL DISCHARGE COLLECTOR

BACKGROUND OF THE INVENTION

Disposition of ash generated in a charcoal grill used for cooking has long been a problem from the standpoints of safety, cleanliness, convenience and ability to maintain a continuous burn. Some grills have an impervious metal body with no provision for discharge of ash and cooking must be interrupted after a few hours for removal of ash buildup which would otherwise extinguish the fire. Newer grills have vent ports to provide air for combustion and serve as an escape for ash which upon release is free to be carried away by the wind either before or after reaching an insufficient storage area. Ash not properly confined can be hazardous when hot and a filthy nuisance at any time.

Kettle grills have become extremely popular but thus far lack adequate ash capture capability and storage capacity due to space limitations between grill support legs. This invention accommodates grills of all sizes and permits placement of an extraordinarily large and volumious collector in close proximity to vent ports from which ash emanates. Slots in the collector's sidewall provide clearance for the grill's legs thereby allowing the collector to be raised close to the grill while the sections of the collector sidewall between slots function as windshields so ash can fall into the collector's storage area before being blown away by the wind. The collector's entry leg slot is deeper and of special shape to permit placing the collector between the grill's legs. A baffle is needed inside the collector for isolating the entry leg slot from the ash storage area to permit ash build up rather than spilling out of the entry leg slot, especially when a collector full of ash is removed from under the grill. The specially shaped entry leg slot of the collector and associated baffle are critical innovations of this invention because they allow the collector to be easily removed from under the grill while maintaining a complete upright orientation so none of the ash contents are spilled. After the collector is placed under the grill and raised into position it is suspended from a bolt protruding from the bottom center of the grill which is engaged by a hanger bar assembly equipped with a latching feature affixed to the top of the collector. The latching mechanism is activiated by thumb pressure on operation tabs positioned adjacent to the collector's handles. The user can conveniently grasp both collector handles and then operate the innovative latching mechanism with one or both thumbs to engage or release the locking mechanism.

Advantages of the charcoal grill discharge collector are that it is easy to use, stays securely in place, safe for the user and the environment, eliminates most of the ash mess associated with charcoal grilling and considerably extends the interval between ash removals.

DESCRIPTION OF DRAWINGS

FIG. 2A is a cross-section of the hanger bar assembly showing construction features and their relationship in the unlocked position. FIG. 2B is a view looking up at the bottom of the hanger bar assembly and grill underside. FIG. 2C is a view similar to FIG. 2B with the hanger bolt deleted to emphasize the opening through which the hanger bolt enters the hanger bar assembly.

FIGS. 3A and 3B are similar to FIGS. 2A and 2B. FIG. 3C is similar to FIG. 2C except it shows the interference of the locking bar's narrow keyhole slot portion which engages the locking bolt, thereby securing collector in its service position on the grill. The side of the hanger bolt clearance hole holds the hanger bolt centered on the hanger bar assembly, preventing it from moving in the keyhole slot.

FIG. 4 shows top and front views of the charcoal grill discharge collector which are complete except for the mating hanger bolt mounted on the bottom center of the grill body. FIG. 4A is a top view showing the relationship of the entry leg slot, ash baffle and ash drop areas. FIG. 4B is a front view showing the irregular shape of the larger entry leg slot relative to the other smaller, symmetrical leg slots shown in FIG. 4C. FIGS. 4A and 4B both show the hanger bar assembly in the locked position and the convenient relationship of locking bar operation tabs to collector handles.

DETAILED DESCRIPTION

Figure 1:
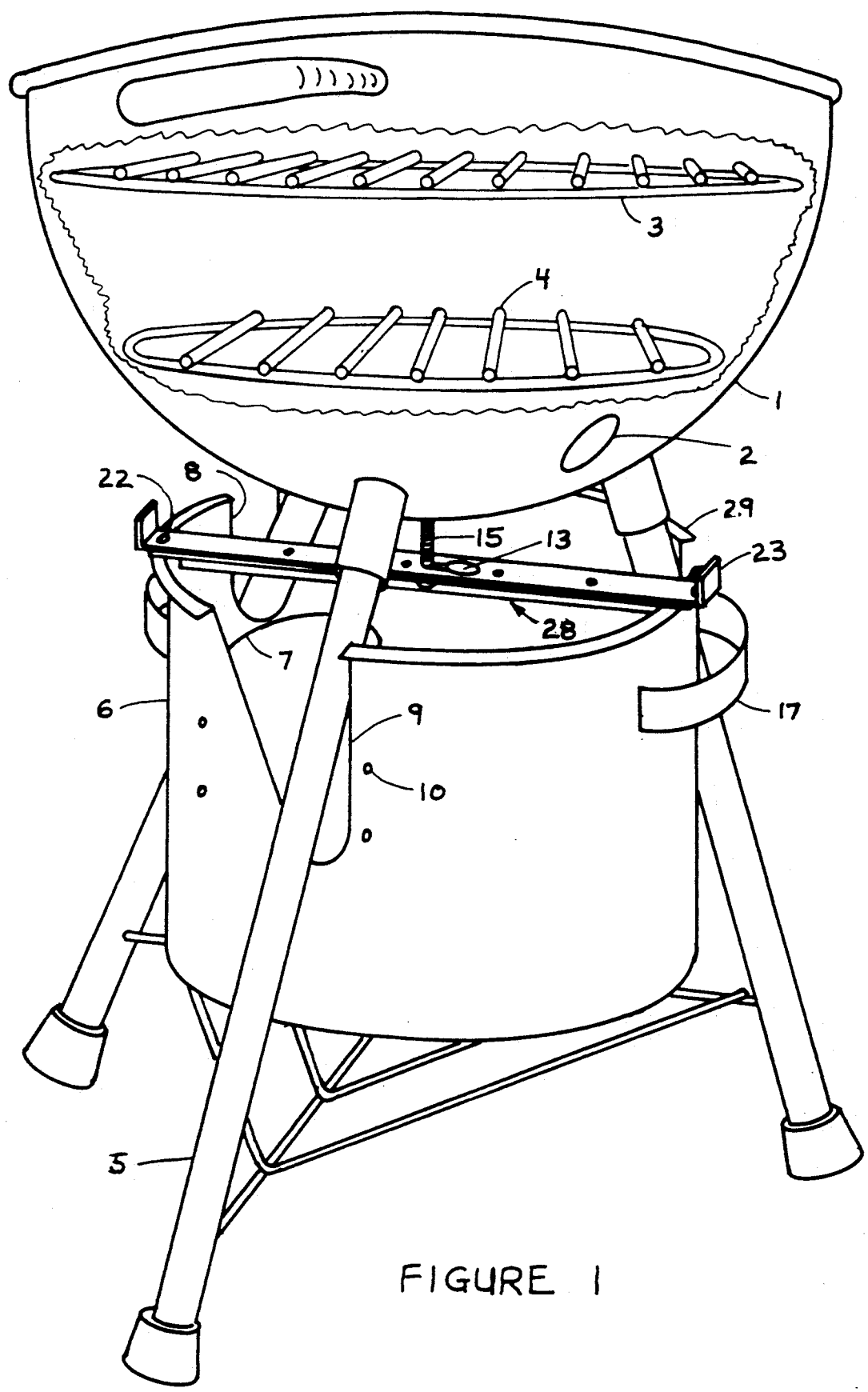
FIG. 1 is a perspective view of the charcoal grill discharge collector secured in position on a kettle-type charcoal grill.

This charcoal grill discharge collector invention is to be used on a charcoal fired grill, shown in FIG. 1, normally used for cooking and consisting of a grill body 1 with multiple vent ports 2 and containing a cooking grill 3 and charcoal grate 4, all of which are supported by a plurality of diverging legs 5 affixed to the underside of the grill body 1.

The charcoal grill discharge collector consists of a pot-like collector 6 having handles 17, an entry leg slot 9, multiple regular leg slots 8, ash baffle 7 held in place with rivets 10, a hanger bar assembly 28 made up of support bar 12 and locking bar 11 held loosely together with rivets 14 and rivet washers 20, all of which are mounted on collector rim 29 with rivets 16, and, a hanger bolt 15 affixed to the bottom center of the grill body 1.

Collector 6, shown in FIG. 4, is a rimmed pot-like metal container having a continuous vertical side interrupted by a plurality of symmetrical regular leg slots 8 and a deeper, asymmetrical entry leg slot 9 where the radius at all slot bottoms is the same and the radii's vertical center lines are spaced to coincide with grill legs with one side of entry leg slot 9 relieved from a point of tangency with the bottom radius to the collector rim 29 for clearance permitting a leg 5 entry into the collector 6 interior during placement of collector 6 between legs 5 and under the grill body 1 necessitating entry leg slot 9 be isolated from ash drop area 26 buildup in collector 6 interior by a sheet metal baffle 7 secured inside collector 6 with rivets 10. Two collector handles 17 and collector rim rivet holes 25 are diametrically opposed and centered about the collector with collector handles 17 near the top of collector 6 and within a user's thumb reach of operating tabs 23 on locking bar 11 which is part of hanger bar assembly 28 secured to collector 6 with rivets 16 in holes 24 of support bar 12 and holes 25 in collector rim 29.

Figure 2:
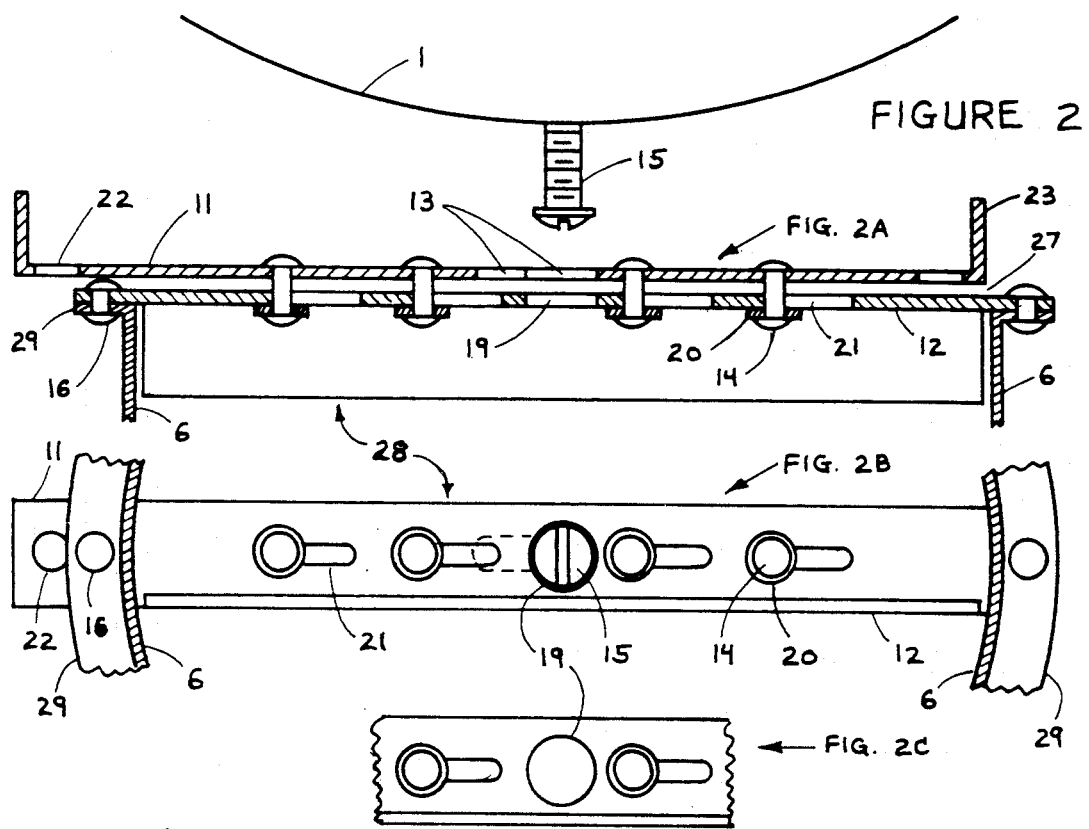
FIG. 2 shows the collector's hanger bar assembly in the unlocked position approaching the grill mounted hanger bolt.
Figure 3:
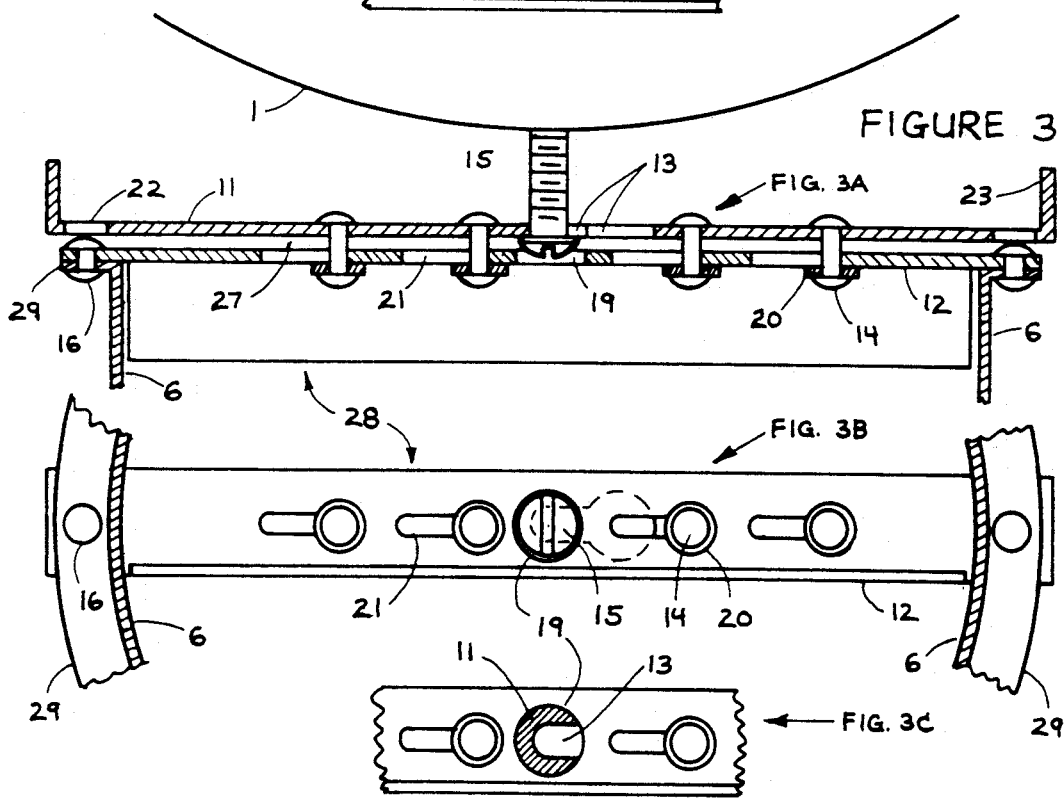
FIG. 3 shows the collector's hanger bar assembly locked onto the grill mounted hanger bolt.
Figure 5:
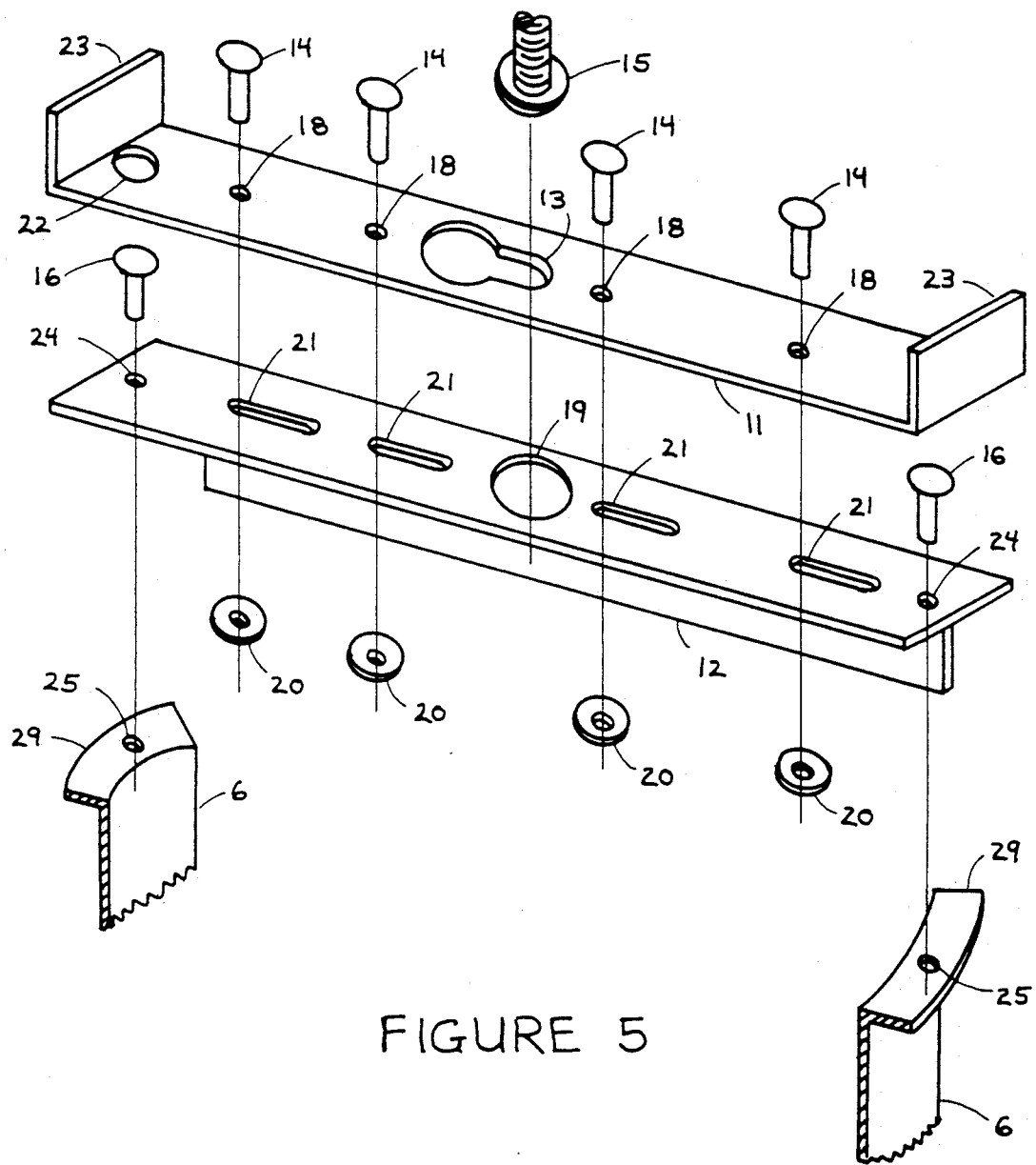
FIG. 5 is an exploded view of the hanger bar assembly, hanger bolt and collector.

Hanger bar assembly 28, shown in exploded view FIG. 5, has two holes 24 for mounting it at collector rim holes 25 with rivets 16 and is made up of locking bar 11 loosely assembled with clearance 27 to support bar 12 with rivets 14 in holes 18 of locking bar 11 and slots 21 of support bar 12 and set against rivet washers 20 on the underside of support bar 12 for free movement of locking bar 11 relative to support bar 12 as limited by the shank of rivet 14 in slot 21, shown in FIGS. 2 and 3, such that the large diameter of keyhole locking slot 13 in locking bar 11 may align with hanger bolt clearance hole 19 in support bar 12 at one extreme of the movement, shown in FIG. 2, whereas the center of the small diameter of keyhole locking slot 13 may simultaneously align with the centers of hanger bolt clearance hole 19 and hanger bolt 15 for entrapment of hanger bolt 15 after it enters both bars at the other extreme of locking bar 11 movement, shown in FIG. 3, caused by pressure put on operation tab 23. When locking bar 11 is shuttled into the engagement position of keyhole locking slot 13 with hanger bolt 15, shown in the charcoal grill discharge collector's normal service position of FIG. 3, locking bar 11 relaxes as its snubber hole 22 centers over the head of collector mounting rivet 16 which in any other position flexes and stresses locking bar 11 because clearance 27 shown exaggerated for drawing clarity is really only a fraction of the head height of collector mounting rivet 16, whereby the interference of the head of collector rivet 16 in snubber hole 22 of locking bar 11 provides the safety feature of restraining locking bar 11 in its engagement position to counter the effects of system vibration due to wind or grill movement.

I claim:

1. A charcoal grill discharge collector for capturing and storing ash emanating from a charcoal fired barbeque grill, said grill including ash emanating vent ports and a plurality of supporting legs, said charcoal grill discharge collector comprising a high sided collector which includes a bottom, an open top, side walls, a hanger bar assembly at the top, a plurality of handles protruding from the side walls of the collector and a hanger bolt; said side walls include a plurality of slots, one of which is deeper than the rest and has one side relieved, therein into which the plurality of legs extend and a baffle inside the collector about the deeper slot and associated leg, portions of the side walls between adjacent slots extending to close proximity to said vent ports; wherein the collector is suspended from a hanger bolt on the bottom of the grill by a hanger bar assembly which is operable into and out of engagement with the hanger bolt; wherein the collector and hanger bar assembly are suspended from the hanger bolt when in the engagement position and the collector and hanger bar assembly can be removed when the hanger bar assembly is out of the engagement position.

* * * * *